Patented Nov. 5, 1929

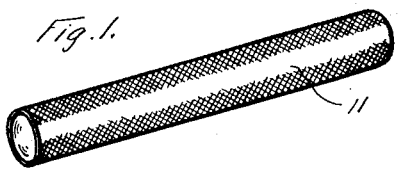
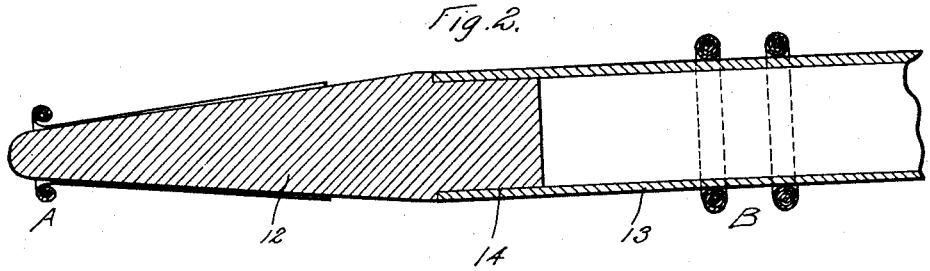
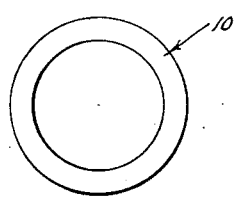
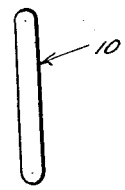
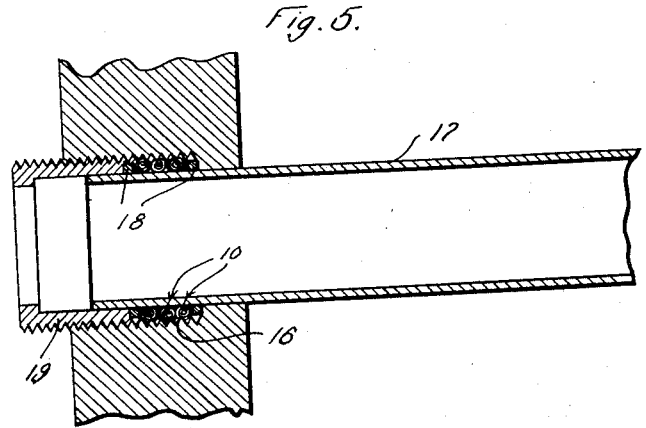

1,734,470

UNITED STATES PATENT OFFICE

ROBERT B. KELLOGG, OF LONG BEACH, CALIFORNIA

PACKING AND METHOD OF MAKING THE SAME

Application filed July 15, 1925. Serial No. 43,775.

This invention has to do with packing and a method of making the same, and it is an object of the invention to provide a simple, practical and inexpensive packing and method of manufacturing therefor.

The packing provided by this invention is useful in various situations and for various uses. It is particularly useful and effective in packing shafts, tubes, etc., for example, condenser tubes. I will, for purpose of example, refer to the packing provided by my invention as for condenser tubes, as such application may be considered typical and as my invention overcomes difficulties that have been experienced in this particular class of packing. However, when I make such specific reference I do not wish to be construed as limiting the scope or range of application of my invention.

Numerous forms of packing have been applied to condenser tubes, none of them being altogether satisfactory. Some of the most satisfactory results have been obtained by using strips of fabric in the form of corset lacing; the lacing being wrapped around the tubing and compressed in the gland. This has not been completely satisfactory as a strip of fabric cannot be uniformly applied and presents joints and ends which frequently allow leakage.

It is an obect of my invention to provide a packing such as a condenser tube packing which overcomes those difficulties commonly experienced with usual forms of packing.

Another object of my invention is to provide a fabric packing in the form of ring or loop which does not present undesirable joints and free ends.

A further object of this invention is the provision of a simple, practical method of manufacture for the packing.

The objects and features of my invention will be best and more fully understood from the following detailed description of a typical form and carrying out of the invention throughout which description reference is had to the accompanying drawings in which Fig. 1 is a perspective view illustrating a strip or piece of fabric employed in forming the packing.

Fig. 2 is a sectional view of apparatus that may be employed in carrying out the method provided by this invention and showing packing formed and in process of being formed.

Fig. 3 is a front or face view of the packing provided by this invention.

Fig. 4 is an end view of the packing and

Fig. 5 is a sectional view of the packing gland illustrating the manner in which the packing may be used.

In accordance with the preferred form of my invention I form the rolled endless fabric ring of packing 10 shown in Figs. 3 and 4 of the drawings from a strip 11 of fabric, tubular in form and possessing characteristics which permit of the operations hereinafter described: In practice I have found it advantageous to employ a knitted tubular strip of fabric 11, such for example, as is commonly employed as lacing. The ordinary tubular lacing is knitted so that it can be stretched and formed in the manner hereinafter described. The tubular strip of fabric is rolled from one end until it is in a form such as is shown in Figs. 3 and 4 of the drawings and in the form it is preferably saturated with a suitable filling material such, for instance, as beeswax, tallow, etc. The finished packing 10 comprising the rolled annular body of fabric saturated with the filling material, such as I have mentioned, is more or less firm, retains its shape, and yet readily conforms to the various parts of a packing gland to make a particularly tight, durable joint.

In accordance with the method of manufacturing provided by this invention the strip 11 of tubular knitted fabric is slid and somewhat expanded onto a tapered mandrel 12 from the small end of the mandrel and is then rolled toward the large end of the mandrel as illustrated at A of Fig. 2. The rolling of the strip of material is continued until the entire strip of material is in the form of a roll on the mandrel whereupon it is passed from the large end of the mandrel onto a carrier 13 which operates to hold it in the form that it leaves the mandrel. It would be obvious of course, that the large end of the mandrel and carrier which receives packings from the mandrel may be made of such size as to give the finished packings the desired internal diameter and that the size of the packings in cross section will depend upon the length and proportioning of the strip of material from which the packing is formed. In practice the carriers may be in the form of tubing and the mandrel may be provided at its large end with an extension 14 adapted to extend into the end of the tubing to hold the mandrel and tubing in alignment as the rolled packing is being passed from the mandrel onto the tubing.

To saturate or impregnate the rolled bodies of fabric, such as are illustrated at B in Fig. 2 with the desired material the carriers may be removed from the mandrel and submerge in, or in any desired manner subjected to, the material. I have found in practice that a mixture of equal parts of tallow and beeswax forms a compound which can be practically applied to the fabric and which gives very satisfactory results. To apply a mixture of tallow and beeswax to the rolled fabrics the carriers may be submerged in a boiling body of the mixture of these substances long enough to allow the mixture to completely penetrate the entire body of fabric. When the carriers are removed from the boiling mixture, the excess mixture drains off. Upon cooling the mixture throughout, the bodies of fabric congeal, so that the finished packings remain in shape and can be easily handled. It will be obvious, of course, that the mixture or filling material in the fabric although congealed at ordinary temperatures is sufficiently soft to allow the packing to readily conform to the various parts of a packing gland or other device in which the packing may be used.

In using the packing which I have described, one or more bodies 10 may be arranged in a packing gland 16 around a tube 17, or the like, between suitable washers 18 and may be compressed together to tightly pack the gland and the tube through an ordinary compression member 19, such as a ring screw threaded onto the outer part of the gland to engage the outer washer 18. It is to be understood, of course, that this particular application of the packing is merely given for purpose of example, and is not to be understood as limiting in any way the scope or range of application of the packing.

The packing which I have provided possesses the desirable characteristics of fabric packings without the undesirable characteristics such as, joints, and free ends. It is to be noted that the packing is uniform in size at all parts and is such as to uniformly fit a packing gland. Further, it is to be noted that the packing is formed entirely of simple, inexpensive and easily obtained materials and that it is in such form and shape as to be easily handled both transported and applied to packing glands.

Having described only a typical preferred form of my invention I do not wish to limit myself to the specific details set forth, but wish to reserve to myself any changes or variations that may appear to those skilled in the art or fall within the scope of the following claims:

Having described my invention, I claim:

1. Packing including an elongated knitted tubular fabric longitudinally rolled from one end to form a ring substantially round in cross sectional configuration.

2. Packing including a fabric ring substantially round in cross section and saturated with a compound including beeswax and tallow, the ring being formed of an elongated tubular knitted fabric rolled back upon itself from one end.

3. The method of making packing including rolling an elongated tubular fabric back upon itself from one end throughout its length, and then applying a filling material to the fabric.

4. The method of making packing including rolling a length of tubular knitted fabric back upon itself from one end to form an endless ring substantially round in cross section and then saturating the fabric with a filling material.

In witness that I claim the foregoing I have hereunto subscribed my name this 17th day of June, 1925.

ROBERT B. KELLOGG.